US009398645B2

(12) United States Patent
Gray

(10) Patent No.: US 9,398,645 B2
(45) Date of Patent: Jul. 19, 2016

(54) CURRENT DETECTING AND SWITCHING APPARATUS

(71) Applicant: Standex International Corporation, Salem, NH (US)

(72) Inventor: Terry Gray, McKinney, TX (US)

(73) Assignee: STANDEX INTERNATIONAL CORPORATION, Salem, NH (US)

( * ) Notice: Subject to any disclaimer, the term of this patent is extended or adjusted under 35 U.S.C. 154(b) by 324 days.

(21) Appl. No.: 14/156,634

(22) Filed: Jan. 16, 2014

(65) Prior Publication Data

US 2014/0203652 A1 Jul. 24, 2014

Related U.S. Application Data

(60) Provisional application No. 61/754,592, filed on Jan. 20, 2013.

(51) Int. Cl.
*H02J 3/14* (2006.01)
*H05B 6/68* (2006.01)

(52) U.S. Cl.
CPC ............... *H05B 6/68* (2013.01); *Y10T 307/696* (2015.04)

(58) Field of Classification Search
CPC .............................. H05B 6/68; Y10T 307/696
USPC ............................................................ 307/38
See application file for complete search history.

(56) References Cited

U.S. PATENT DOCUMENTS 5,212,360 A 5/1993 Carlson
5,321,235 A * 6/1994 Makino ................ H05B 6/6432 219/716
6,018,700 A * 1/2000 Edel ................... G01R 19/2513 361/18

* cited by examiner

*Primary Examiner* — Jared Fureman
*Assistant Examiner* — Duc M Pham
(74) *Attorney, Agent, or Firm* — William B. Ritchie

(57) ABSTRACT

A current detecting and switching apparatus that provides automatic coupling of internal components of an appliance to varying supply voltage sources to prevent components from operating at something other than their intended power rating. The switching apparatus provides automatic coupling to multi-rated internal components of the appliance instead of providing a voltage specific appliance pre-wiring of specific connections of a multi-voltage component.

4 Claims, 1 Drawing Sheet

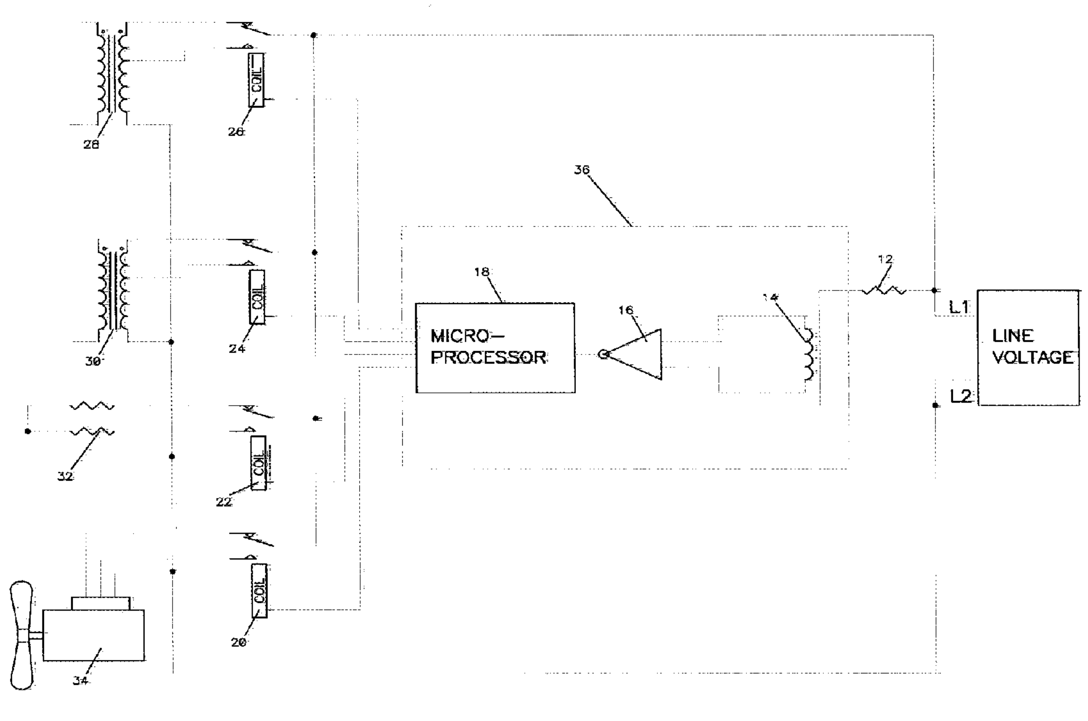
COIL
26
28
36
COIL
24
30
18
MICRO-PROCESSOR
16
14
12
L1
LINE VOLTAGE
L2
COIL
22
32
COIL
20
34

CURRENT DETECTING AND SWITCHING APPARATUS

This application claims benefit of U.S. Provisional Application Ser. No. 61/754,592 filed Jan. 20, 2013, pursuant to 35 USC §119(e).

FIELD OF THE INVENTION

This invention relates to electrical circuits, in particular, a current detection circuit used to detect available line voltage for an appliance and then automatically switching the appliance's internal components to match the available line voltage for use in microwave ovens.

BACKGROUND OF THE INVENTION

Prior art circuitry measures the available line voltage supplied to an appliance by employing a comparator on a microprocessor that compares the line voltage to a referenced voltage. An example of such circuitry is disclosed in U.S. Pat. No. 5,212,360, issued to Carlson on May 18, 1993. This device provides direction to automatically switch multi-rated internal components of an appliance to accommodate the detected line voltage supplied to that appliance. The electrical components within the appliance are provided with multiple connections for various potential line voltages thus allowing the automatic switching to match the measured line voltage.

Additional prior art measures the available line voltage as disclosed in the '360 Patent but does not automatically switch internal components. These circuits notify the user of the magnitude of the available line voltage but require manual switching of the appliance's electrical components.

There is not found in the prior art a circuit that automatically and accurately matches the required voltage to each component using an analog to digital converter (ADC) by routing one leg of a heater supply through the ADC.

SUMMARY OF THE INVENTION

It is an aspect of the invention to provide a current detecting and switching apparatus that provides automatic coupling of internal components of an appliance to varying supply voltage sources to prevent components from operating at something other than their intended power rating.

Another aspect of the invention is to provide a current detecting and switching apparatus that provides automatic coupling of internal components to varying voltage sources to prevent damage to components by operating them at higher or lower than intended power levels since magnetrons and heaters, operating at either higher or lower voltages than those for which they are designed causes undue stress on that component and may substantially reduce the life span of that component significantly or reduce the output of the component, rendering much less effective for its intended purpose.

It is still another aspect of the invention to provide a current detecting and switching apparatus that provides automatic coupling to multi-rated internal components of the appliance instead of providing a voltage specific appliance pre-wiring of specific connections of a multi-voltage component.

It is an aspect of the invention to provide a current detecting and switching apparatus that provides automatic coupling of multi-rated internal components of the appliance instead of changing over wiring in the field of the component connections internal to the appliance.

Another aspect of the invention is to provide a current detection and switching apparatus that uses a discrete analog to digital converter to increase the accuracy of distinguishing between two relative voltages in order to compensate for a component's current changes as that component ages.

Finally, it is an aspect of the invention to provide a current detecting and switching apparatus that provides automatic coupling of multi-rated internal components of the appliance to eliminate manually or semi-automatically switching the internal components by the user.

BRIEF DESCRIPTION OF THE DRAWING

FIG. 1 is a diagram of the preferred circuitry of the current detecting and switching apparatus in accordance with the invention.

DETAILED DESCRIPTION OF THE INVENTION

FIG. 1 shows a circuit diagram that illustrates a method of determining voltage without the use of a comparator on the microprocessor. The use of a discrete ADC (analog to digital converter) is much more accurate (several orders of magnitude) than simply using a comparator to distinguish two relative voltages. The advantage of this accuracy comes in as the components age. As a heater ages, it tends to draw less current. As a magnetron transformer ages, it tends to draw more current. The above-mentioned accuracy is a distinct advantage in these cases over prior art devices.

The incoming electrical supply is sent to the control board 36 where it is split, with one component L1 going to a heating element of known resistance 12, the two electrical wires carrying L1 and L2 then pass through a current transformer 14 where the amount of current is measured. This measurement is then amplified by an operational amplifier 16 and the voltage is measured using the formula V=IR, where V=voltage, I=current measured, and R=known resistance of the heater. The voltage measured is then provided to the microprocessor 18 that then automatically switches, via relays 20 thru 26, the voltage to the appropriate multi-rated components 20 thru 26.

Although the present invention has been described with reference to certain preferred embodiments thereof, other versions are readily apparent to those of ordinary skill in the preferred embodiments contained herein.

What is claimed is:

1. A current detection and switching apparatus for an appliance having a plurality of components wherein each component having differing power ratings that may vary over time as each component ages; said apparatus comprising:

- a control board for splitting an incoming electrical supply to the appliance into two branches, with one branch going through a resistor with known resistance and wherein the two branches feed into a current transformer in order to measure the current being supplied;
- an operational amplifier connected to said current transformer wherein the measurement of the current being supplied is amplified and then the voltage is measured;
- a microprocessor connected to said operational amplifier automatically switches the proper voltage to each of the plurality of components such that each component operates at its intended power rating.

2. The apparatus of claim 1 wherein the voltage supplied by said microprocessor is automatically switched via a plurality of relays, with each relay corresponding to each one of the plurality of component.

3. The apparatus of claim 2 wherein the plurality of components are selected from the group consisting of heaters, magnetrons, transformers, and motors.

4. The apparatus of claim 2 wherein said appliance is a microwave oven.

* * * * *